UNITED STATES PATENT OFFICE 2,516,741

COMPOSITION OF BRITTLE RESIN AND STYRENE-ISOBUTYLENE COPOLYMER

David W. Young, Roselle, and William J. Sparks, Cranford, N. J., assignors to Standard Oil Development Company, a corporation of Delaware No Drawing. Application October 12, 1944, Serial No. 558,489

2 Claims. (Cl. 260—23)

This invention relates to novel plastic compositions, and to methods of preparing and using same; and more particularly it relates to a particular combination of a certain particular type of hydrocarbon resinous plastic with a brittle, rigid, non-flexible resin containing not only hydrogen and carbon but also either oxygen or nitrogen.

Many different plastics are known to the art, and although certain ones of them are useful per se for certain purposes, many of the ones which have the best properties in certain respects such as hardness, for instance, cannot be used without having a plasticizer or softener added thereto; but it is difficult, and has in many cases been impossible, to find a plasticizer which is entirely satisfactory for some of the best resins, which includes particularly the high molecular weight normally brittle, hard, rigid, non-flexible resins containing hydrogen and carbon and also containing at least one element selected from the group consisting of oxygen and nitrogen. Apparently it is these latter two elements which prevent the compatibility of such resins with certain materials such as high molecular weight polybutene which is one of the best heretofore available plasticizers from the point of view of moisture-resistance, flexibility and good electrical insulation properties. The result is that such brittle oxygen- and nitrogen-containing resins usually have heretofore been plasticized with relatively low molecular weight materials containing oxygen or nitrogen, such as dibutyl sebacate, tricresyl phosphate, dioctyl phthalate, dibutoxy ethyl phthalate, lactyl lactic acid, lauric acid, lepamine, lignoceric acid, alutidine, malamide and naphthoicamide, which generally have the disadvantage that they have a slight vapor pressure even at ordinary atmospheric temperatures and therefore gradually vaporize and permit the resin composition to get harder upon aging and therefore more brittle, these disadvantages being aggravated by storage or exposure to more elevated temperatures.

It has also been suggested heretofore to use certain hydrocarbon materials such as a copolymer of styrene and isobutylene of relatively low styrene content made at low temperatures below 0° such as —20° C. or even —80° C. to plasticize rubber, but such copolymers, having for instance a combined styrene content of 10% or 20% and a high molecular weight, are not compatible with high molecular weight brittle resins containing above 2% of oxygen or nitrogen. Styrene-isobutylene copolymers of a somewhat intermediate molecular weight but of a brittle nature can be made at temperatures such as —20° C. and —45° C., with a styrene content of 50% or more. It is also known that styrene-isobutylene copolymers of very high styrene content, i. e. 65 to 95%, e. g. 70% and 90%, made at temperatures below —50° C., are compatible with many of the oxygen- and nitrogen-containing resins, but these hydrocarbon copolymers are per se too rigid and hard to serve as good softeners or plasticizers, even though they are highly useful in making moulded plastics or compounded hard, brittle resins which have good electrical insulating properties, etc.

It has now been found that many of these difficulties attending the use of high molecular weight brittle resins containing oxygen and nitrogen, can be eliminated largely, if not completely, by compounding therewith a styrene-isobutylene copolymer, or such equivalents as will be hereinafter described, which is made within a relatively narrow range of proportions of the styrene and isobutylene, and made only at extremely low temperature. This particular type of copolymer is found to have satisfactory compatibility with high molecular weight brittle resins containing oxygen and nitrogen, and yet have good flexibilizing action. In other words, this particular copolymer acts like a high molecular weight plasticizer or solvent for the brittle oxygen- or nitrogen-containing resins, but it will not vaporize, and consequently this novel plastic composition will not change in plasticity and hardness with age, nor will its excellent electrical insulating properties and resistance to moisture vapor penetration change with age.

The general method of preparing styrene-isobutylene copolymers is described in U. S. Patent 2,274,749, and comprises effecting the copolymerization at a temperature below about 0° C. in the presence of an active halide polymerization catalyst, preferably in the presence of an inert volatile organic liquid serving as a solvent and/or refrigerant, using temperatures for instance of —20° C., —40° C., —80° C., or even lower, and using various proportions of styrene and isobutylene.

However, according to the present invention, it has been found that out of the vast number of different types of copolymers which are possible with various combinations of temperature and styrene content, only a relatively narrow combination of conditions will result in copolymers which can be used for the novel purposes of the present invention, namely, by carrying out the copolymerization at temperatures which are below —70° C., and preferably below —80° C., e. g. —103° C., the boiling point of ethylene, or lower, and by using a styrene content within the narrow range of 30 to 60%, and a corresponding isobutylene content of 70 to 40%. If copolymerization temperatures substantially higher than —70° C. are used, the resulting copolymers are found to be too brittle or lacking in plasticizing and flexibilizing characteristics, and on the other hand, if a styrene content is used which is substantially higher than 60% the resulting product also becomes too rigid and inflexible with little or no plasticizing property, whereas if a styrene content substantially less than 30% is used, the resulting copolymer becomes incompatible with the brittle high molecular weight resins containing oxygen and nitrogen. It is thus apparent that the particular combination of proportions and operating conditions employed according to this invention obtained such an unobvious combination of properties as to permit the production of certain compounded resins and plastics never heretofore known or even thought possible.

The preparation of the hydrocarbon copolymer will now be further discussed. Instead of isobutylene, other aliphatic olefins or alkenes may be used, preferably having more than two carbon atoms and preferably isoolefins having 4 to 8 carbon atoms, such as isopentene (2-methyl-1-butene) or a normal pentene obtained by dehydration of secondary amyl alcohol.

Instead of styrene, other cyclic polymerizable hydrocarbons may be used such as alpha methyl styrene, para methyl styrene, alpha methyl para methyl styrene, indene, terpenes, etc.

The copolymerization is effected by mixing the two reactants, with or without a mutual solvent, if necessary, such as ethylene, propane, butane, methyl chloride, refined naphtha, etc., and then after cooling the reactants to the desired low temperature, adding an active halide catalyst such as boron fluoride, or activated boron fluoride catalyst (e. g., .1% ether added), aluminum chloride, titanium tetrachloride, aluminum alkoxide-aluminum chloride complex (AlCl$_3$.Al[OC$_2$H$_5$]$_3$)

AlBr$_3$, AlBr$_3$.Al(OC$_2$H$_5$)$_3$, (AlBr$_3$)$_4$.AlOBr and the like. If desired, such catalyst may be dissolved in a solvent such as carbon disulfide, a low molecular weight sulfur-free saturated hydrocarbon, a lower alkyl halide, e. g. methyl chloride or ethyl chloride or a mixture of methyl chloride with butane or propane, at or below the boiling point of the catalyst solvent, and then the catalyst solution cooled down, filtered and added to the reaction mixture. Alternative catalysts include: AlCl$_3$.AlCl$_2$OH, AlBr$_3$.AlBr$_2$OH, AlBr$_2$Cl.AlOCl AlBrCl$_2$.AlOBr, TiCl$_4$.AlCl$_2$OH, TiOCl$_2$.TiCl$_4$, AlBr$_3$.Br$_2$.CS$_2$, AlBr$_3$.Br$_4$.CS$_2$, BF$_3$-isopropyl alcohol complex, BF$_3$ solution in ethylene, activated BF$_3$ catalyst in ethylene solution, activated BF$_3$ catalyst in methyl chloride solution. Volatile solvents or diluents, e. g. propane, ethane, ethylene, methyl chloride, carbon dioxide (liquid or solid), liquid nitrogen, etc. may also serve as internal or external refrigerants to carry off the liberated heat of polymerization. After completion of the copolymerization, residual catalyst may be hydrolyzed with alcohol, for example, isopropyl alcohol, or water, or both, and removed by washing the product with water and preferably also with dilute aqueous caustic soda.

The resulting solid copolymer may range from a relatively stiff plastic mass which may even have slight elastic properties, to a hard resinous but tough and slightly flexible solid, the greater flexibility and plasticizing properties being obtained, the further the copolymerization temperature is reduced below —70° C., and the further the styrene content is reduced from 60% toward the 30% minimum permissible limit. The preferred content of styrene or other cyclic polymerizable hydrocarbon is from 40 to 55% and the preferred temperature is below —80° C., the copolymerization being preferably effected by a Friedel-Crafts catalyst such as AlCl$_3$ dissolved in a lower alkyl halide such as methyl chloride, and preferably the copolymerization feed mixture being diluted with about 100 to 400% by volume of lower alkyl halide such as methyl chloride.

The proportions in which the cyclic polymerizable hydrocarbon and the alkene have actually combined during copolymerization may be determined by interpolation of a carbon-hydrogen analysis between the limits of representing 100% of each separate reactant, as for instance, in the case of styrene and isobutylene, between the limits:

|  | Carbon | Hydrogen |
|---|---|---|
|  | Per cent | Per cent |
| Pure styrene | 92.3 | 7.7 |
| Pure isobutylene | 85.7 | 14.3 |

Generally the intrinsic viscosity of the resulting copolymer prepared according to this invention should be above 0.5, preferably above 0.6, and the average molecular weight will generally be above 7,000, or within the approximate limits of 7,000 to 100,000, and preferably within the approximate limits of 15,000 to 30,000. These copolymers are thermoplastic and have heat softening points between the approximate limits of 30° C. and 170° C., preferably about 35° C. to about 85° C.

For convenience and brevity, the above described copolymer of a cyclic polymerizable material and an olefin or alkene will be referred to as a cycalkene copolymer, or simply a cycalkene. The specific type of copolymer made from styrene and isobutylene will similarly be referred to for brevity as stybutene copolymer, or simply stybutene. The invention will be illustrated as applied particularly to stybutene, although it is not to be limited specifically thereto.

The other chief constituent of the compositions made according to this invention, namely the normally brittle, rigid, non-flexible high molecular weight resin containing not only carbon and hydrogen but also either oxygen or nitrogen, should generally be one having a hardness of at least about 70 and preferably at least 90.0, according to the Shore hardness durometer test. The invention is particularly applicable to such resins having a brittleness of at least —40° C., by the Thiokol Bend test.

Such hard, brittle, resins may be manufactured by a wide variety of chemical processes, although it should be kept in mind that many, if not all, these processes can result in products which are flexible or even soft and sticky and of relatively low molecular weight, under certain operating conditions, but the present invention is concerned only with the products resulting from such processes when carried out under operating conditions leading to the formation of high molecular weight hard, brittle resins. Such high molecular weight products have numerous advantages over the lower intermediate molecular weight products, including not only hardness but also superior electrical insulating properties, superior resistance to attack by chemical reagents as well as oxidation, moisture, etc., and superior stability against deterioration with age.

The preferred types of hard, brittle resins are those made by polymeric condensation of higher polybasic organic acids, such as the dimers of the higher fatty acids, fatty esters or fatty oils, with a diamine such as ethylene diamine, to make polyamides. Suitable polyamides such as the one called Norelac may be produced by the general method described in the April, 1944 issue of Oil & Soap, page 101.

For these preferred types of brittle resins, the acid reactant is preferably made by polymerization of higher fatty acids such as linoleic acid or other acids present in soybean oil, linseed oil or other drying and semi-drying fatty oils, the polymerization being preferably carried out to selectively produce as high a proportion as possible of dimer fatty acids, although a small proportion of trimer acids may also be present. The corresponding lower alkyl esters of such acids may also be used such as the dimer of methyl esters of soybean fat acids. If desired, the crude fatty acid polymerization product may be purified or fractionated by distillation under reduced pressure to obtain a relatively pure dimer. Although the chemical structure of dilinoleic acid is not known with certainty, the following data indicates its properties:

Unsaturation _____ two double bonds
Molecular weight _____ 560
Neutral equivalent _____ 280
Conjugation _____ negligible
Melting point _____ non-crystalline at —60° C.

At the present time the chemical structure of the acid is thought to be as listed.

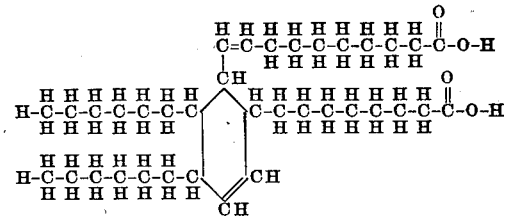

Instead of using this particular type of dibasic acid, other acids which can be used include sebacic, hexadecamethylene dicarboxylic acid,

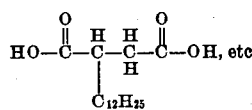

In making the preferred type of polyamide, as referred to above, the diamine to be used may either be one of relatively low molecular weight such as ethylene diamine, propylene diamine, etc. or may be one of considerably higher molecular weight such as pentamethylene diamine, hexamethylenediamine, etc. The resulting preferred polyamides may be considered to have the general formula

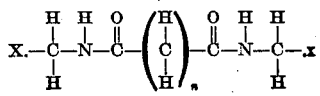

Such polyamides having the desired hardness and other characteristics for the purposes of this invention, should preferably have an average molecular weight of at least 2,000, and preferably at least 10,000, and they are generally insoluble in mineral oils and in many of the low boiling solvents such as toluene, carbon tetrachloride, acetone, etc., although they may be soluble or at least partially soluble in certain low boiling solvents such as chloroform, isopropyl alcohol, etc.

Other high molecular weight polyamides, polyesters, as well as amino resins, etc. may be made by processes such as those described in U. S. Patent 2,071,251.

Other types of high molecular weight brittle resins or plastics containing oxygen and nitrogen include those made by condensation of a polyhydroxy alcohol with a polybasic acid, e. g. by condensation of glycerol phthalic anhydride, alone or with a modifying agent such as linoleic acid, resins made by condensation of formaldehyde with urea or with phenols containing little or no alkyl groups, polymerization products of acrylic esters, methyl methacrylate or vinyl esters, e. g. vinyl acetate or vinyl alcohols or ethers, or normally hard, brittle derivatives of cellulosic compounds, e. g. cellulose acetate, cellulose nitrate, ethyl cellulose, etc.

The proportions in which the flexible hydrocarbon copolymer and the brittle oxygen- or nitrogen-containing resin are to be mixed may vary to some extent according to the nature of the particular constituents used, but normally will be within the approximate limits of 1 to 100 parts, preferably 2 to 80 parts of hydrocarbon copolymer per 10 parts of brittle resin containing oxygen and nitrogen.

In addition to the two primary constituents, the compositions of this invention may also include minor amounts of other additives such as fillers, e. g. clay, carbon black, zinc oxide, etc. or plasticizers, e. g. paraffin wax, petrolatum, zinc stearate, aluminum stearate, zinc dilinoleate, as well as coloring agents, such as pigments, dyes and the like or antioxidants, etc.

The invention has another distinctly unobvious advantage over prior art of plastic or resinous compositions, in that the particular hydrocarbon copolymer used not only serves per se as a plasticizing agent but also in some instances may serve very suitably as a mutual solvent for the hard, brittle oxygen- or nitrogen-containing resin and a lower molecular weight material which could normally be used as a plasticizer for such brittle resin if it were soluble therein or compatible therewith. For instance, hydrogenated castor oil which is a hard, waxy substance and quite useful as a plasticizer for some types of materials, is not completely compatible with ethyl cellulose, but becomes very highly compatible therewith in the presence of a stybutene having a styrene content of for instance 50% or 60%, and made at —103° C.

In carrying out the present invention the two primary constituents, namely, the flexible hydrocarbon copolymer and the hard, brittle resin containing oxygen or nitrogen, optionally together with minor amounts of other additives, are compounded either by hot milling as on heated steel rolls such as used for milling rubber, or by mixing in a heated kneading machine such as a Banbury mixture, and/or by use of volatile solvents with or without heat, using either pressure or refluxing to prevent loss of solvent. Suitable solvents for this purpose include petroleum naphtha, toluene, benzene, CCl₄, chlorinated wax, etc. The amount of solvent to be used may range from 0.1 to 5.0 volumes per volume of mixed plastic.

The novel plasticized resins of this invention may be used in many ways as for instance by rolling or sheeting into thin, self-sustaining films which may be used per se as a water-proof, moisture-proof flexible wrapping material, or as a binder for making laminated sheet material such as for laminating two or more sheets of paper, cloth, wood, metal foil, etc. together in various combinations, or such thin films or sheets may be applied thermoplastically as a coating merely on one side of any type of solid base whether it be rigid such as wood, metal, tile, etc. or a flexible material such as paper, cloth, metal foil, etc. In preparing any of the above types of bonded materials, additional adhesives or bonding agents may be used, as for instance, a thin film of polybutene or a stybutene of low styrene content such as 10 to 30%. In applying these novel compositions as a coating on paper or cloth, the plastic may be applied by passing the paper from a continuous feed roller continuously into a hot molten bath of the plastic, or into a solvent solution of such plastic which may or may not be heated sufficiently to give the desired fluidity and coating or impregnating properties, with or without recovery of any solvent which may have been used, or the paper or similar sheet material may merely be contacted with a roll which in turn dips into a bath of the coating material. It is desirable that coated paper for instance be either freed of residual solvent or cooled or both in order to leave a smooth, non-tacky coating surface on the paper before the coated paper is rolled up in the finished roll.

The objects and advantages of the invention will be better understood from a consideration of the following specific examples.

Example 1

1000 ml. of styrene-isobutylene feed mixture, comprising 600 ml. of styrene and 400 ml. of isobutylene was added to about 3000 ml. of methyl chloride in a large Dewar flask (temperature held to −78° C. by use of powdered CO₂) and to this mixture was added 400 ml. of AlCl₃—CH₃Cl catalyst solution comprising 0.9 gram of AlCl₃ per 100 ml. of CH₃Cl. As the catalyst was added with stirring, the solution became very thick. After about 15 minutes 100 ml. of isopropyl alcohol was added to kill the catalyst and stop the polymerization. The polymer in methyl chloride solution was then placed in a 4 liter Pyrex beaker, which was then heated to remove the methyl chloride. The residual dry, colorless resin which is a styrene-isobutylene copolymer had a heat softening point of 55° C. and an intrinsic viscosity of 0.62.

20 grams of this stybutene copolymer was then placed in a 400 ml. Pyrex beaker and 30 grams of high molecular weight ethylene diamine-dilinoleic acid polyamide resin was added. The resin mixture was heated on an electric hot plate to about 200° C. and agitated for 10 minutes at this temperature, after which the mixture was cooled to room temperature and found to be a hard, clear, homogeneous, light-brown resin. Some of this resin was drawn into thin films when it was hot, and some of the resin was molded very satisfactorily.

Also some of this stybutene-polyamide resin was heated to 225° C. and then coacted on a glassine paper, using about 10 lbs. of coating per ream, with the result that the coated paper had a moisture vapor permeability of 2.3 grams per square meter per 24 hours, at 64% relative humidity at 77° F.

Example 2

Another sample of stybutene of about 60% combined styrene and made according to the method described in Example 1, was compounded with ethyl cellulose and hydrogenated castor oil using the following proportions:

| | Per cent |
|---|---|
| Stybutene | 75 |
| Ethyl cellulose | 20 |
| Hydrogenated castor oil | 5 |

The above materials were dissolved in or compounded with 10 parts by weight of carbon tetrachloride per 100 parts by weight of total plastic solids at a temperature of about 40° C., and the resulting composition was sheeted hot into a film having a thickness of about 0.004 inch and the CCl₄ evaporated. This thin, self-supporting film was smooth, flexible and non-tacky. The moisture vapor permeability of the film by the A. S. T. M. method D697–42T (Part A) issued 1942 was 3.40 g. H₂O/sq.meter/24 hours for a film 0.004 inch thick.

Example 3

Example 2 is repeated but substituting a stybutene of 50% combined styrene content in place of the stybutene used in Example 2, and the resulting composition is found to have even better flexibility and toughness, especially at lower temperatures.

Example 4

A sample of stybutene having a combined styrene content of about 50%, having an intrinsic viscosity of 0.83 is hot milled into Norelac (dimer acid-ethylene diamine resin), using 90% by weight of stybutene and 10% by weight of the Norelac. Evaluation on the product and resin blend will be found in the following table:

| Composition | Per Cent Norelac Added | Tensile at 10″ pull per minute | Total Elongation | Wms. Plasticity at 70° C. | |
|---|---|---|---|---|---|
| | | | | Plasticity | Recovery |
| Styrene-isobutylene copolymer (50% styrene in copolymer) | 0 | Lbs./sq. in. 680 | Per Cent 780 | 158 | 13 |
| Do. | 10 | 740 | 550 | 174 | 9 |

It is to be noted that the Norelac-hydrocarbon copolymer blend had a higher tensile and shorter elongation at break than the original styrene-isobutylene copolymer. Also, the blend had no surface tack at room temperatures. The moisture vapor penetration of a solvent cast and stripped film of this "Norelac-styrene-isobutylene" copolymer mixture was 0.81 g. H₂O per sq. meter per 24 hours for a film 0.007 inch thick. The A. S. T. M. method D697–42T (part A) was used for this work.

Other tests have indicated that stybutene copolymers containing various low concentrations of combined styrene such as 5%, 10%, 15%, 20% and 25% of combined styrene, and made at −103° C. are not compatible with the Norelac resin described in Examples 1 and 4.

Tests have also indicated that a stybutene having a combined styrene content of about 80% and made at −103° C., when compounded in equal proportions with the Norelac described in Examples 1 and 4, made a resulting composition which was unsatisfactory because it was too brittle.

It is not intended that this invention be limited to the specific examples which have been given merely for the sake of illustration but only by the appended claims in which it is intended to claim all novelty inherent in the invention as well as all modifications coming within the scope and spirit of the invention.

It is claimed:

1. A tough, flexible plastic composition comprising about 60% by weight of a high molecular weight normally hard brittle polyamide resin formed by condensation of ethylene diamine and methyl dilinoleate, and homogeneously compounded therewith about 40% by weight of tough, flexible thermoplastic styrene-isobutylene copolymer having a combined styrene content of about 50–60%, and having an intrinsic viscosity of at least 0.6 and a molecular weight of about 7000 to 100,000, and copolymerized at −80 to −103° C.

2. Paper impregnated and coated with a smooth non-tacky film of a plastic composition defined in claim 1.

DAVID W. YOUNG.
WILLIAM J. SPARKS.

REFERENCES CITED

The following references are of record in the file of this patent:

UNITED STATES PATENTS

| Number | Name | Date |
|---|---|---|
| 2,213,423 | Wiezevich | Sept. 30, 1940 |
| 2,249,686 | Dykstra | July 15, 1941 |
| 2,274,749 | Smyers | Mar. 3, 1942 |
| 2,326,699 | Swain | Aug. 10, 1943 |
| 2,379,413 | Bradley | July 3, 1945 |

OTHER REFERENCES

"Synthetic Resins and Allied Plastics," 2nd ed. by Morrell, page 9, pub. 1943 by Oxford Univ. Press.